Sept. 24, 1963  S. K. BENJAMIN ETAL  3,105,235
SWEEP AND FLYBACK CIRCUIT
Filed April 19, 1962  3 Sheets-Sheet 2

3,105,235
SWEEP AND FLYBACK CIRCUIT
Sidney K. Benjamin, New Rochelle, Maurice J. Epstein, Bronx, and Ralph M. Pincus, New York, N.Y., assignors to General Precision, Inc., a corporation of Delaware
Filed Apr. 19, 1962, Ser. No. 188,689
11 Claims. (Cl. 343—8)

This invention relates to Doppler navigating systems for aircraft and particularly to components of such systems for finding and locking to an input Doppler signal.

A Doppler microwave system operates automatically to secure accurate ground speed and drift angle information. Such a system is carried on an aircraft and requires no ground-based components. It operates by directing several microwave beams toward the earth or water, and by receiving echoes of these beams containing Doppler information.

Priciples of such systems are described in Transactions of the Institute of Radio Engineers, volume ANE-4, September, 1957, on pages 103–112. The general design of such systems is described in IRE vol. ANE-4 for December, 1957, on pages 157–175. The specific system for which the present invention was first developed is described in patent application Serial No. 718,376, filed February 28, 1958.

In the Doppler system with which the present invention is designed to cooperate, four beams of microwave radiation are directed from the aircraft toward the earth, and their microwave echoes are received and separately demodulated to secure Doppler information. From this information, aircraft velocity components in the three coordinate directions of space are derived. The circuits deriving this information include a tracking loop having two integrators in tandem. Associated with the loop are speed indicating devices, a signal-to-noise measuring circuit, and a memory circuit which retains the last-computed speed output data in the event that the system loses its input signals by breaking microwave contact with the ground, or for any other reason.

The circuit of the present invention secures its input signals from the acquisition logic circuitry, from the memory circuit through an external computer, and from the output of one of the two integrators of the frequency tracker loop. The circuit also employs this integrator as a sweep generator for the purpose of scanning the Doppler spectrum range. The sweep and flyback circuit starts sweep operation when the Doppler system loses its input signals, or when the system is first turned on, and stops sweeping when an input signal is acquired. Sweep operation consists of continuously scanning the Doppler frequency spectrum range, or part of it, for the purpose of detecting a Doppler signal.

The sweep and flyback circuit of this invention is distinguished by having two distinct sweep ranges, termed the restricted sweep range and the full sweep range. The full sweep scans the full range of Doppler frequencies and the restricted sweep scans that portion of the full range within which the signal is most likely to be found. The portion which is to be scanned is selected by the external computer. The reason that two kinds of sweeps are employed is that acquisition time is saved thereby. In the system described, the full sweep takes nearly two minutes while one restricted sweep takes only 10 seconds. Often, time is important and, particularly in military applications, a few seconds saved in acquiring a navigational signal may be vital. Therefore, the provision of a restricted sweep circuit in addition to the usual full sweep circuit may be desirable and worth the slight additional complication and weight of the equipment.

In the operation of the dual sweep system, after loss of signal or on first starting, the restricted sweep scans that part of the frequency spectrum in which the signal is most likely to be found. After three restricted sweeps, consuming 30 seconds, if a signal has not been found, the system automatically goes to full sweep and alternately sweeps down to minimum aircraft speed and flies back to maximum aircraft speed until a signal is found. Upon finding a sufficiently strong signal during either kind of sweep, the signal is acquired, the frequency tracker commences to track it, and the sweep is discontinued.

Further understanding of this invention may be secured from the detailed description and the associated drawings, in which.

Figure 1:
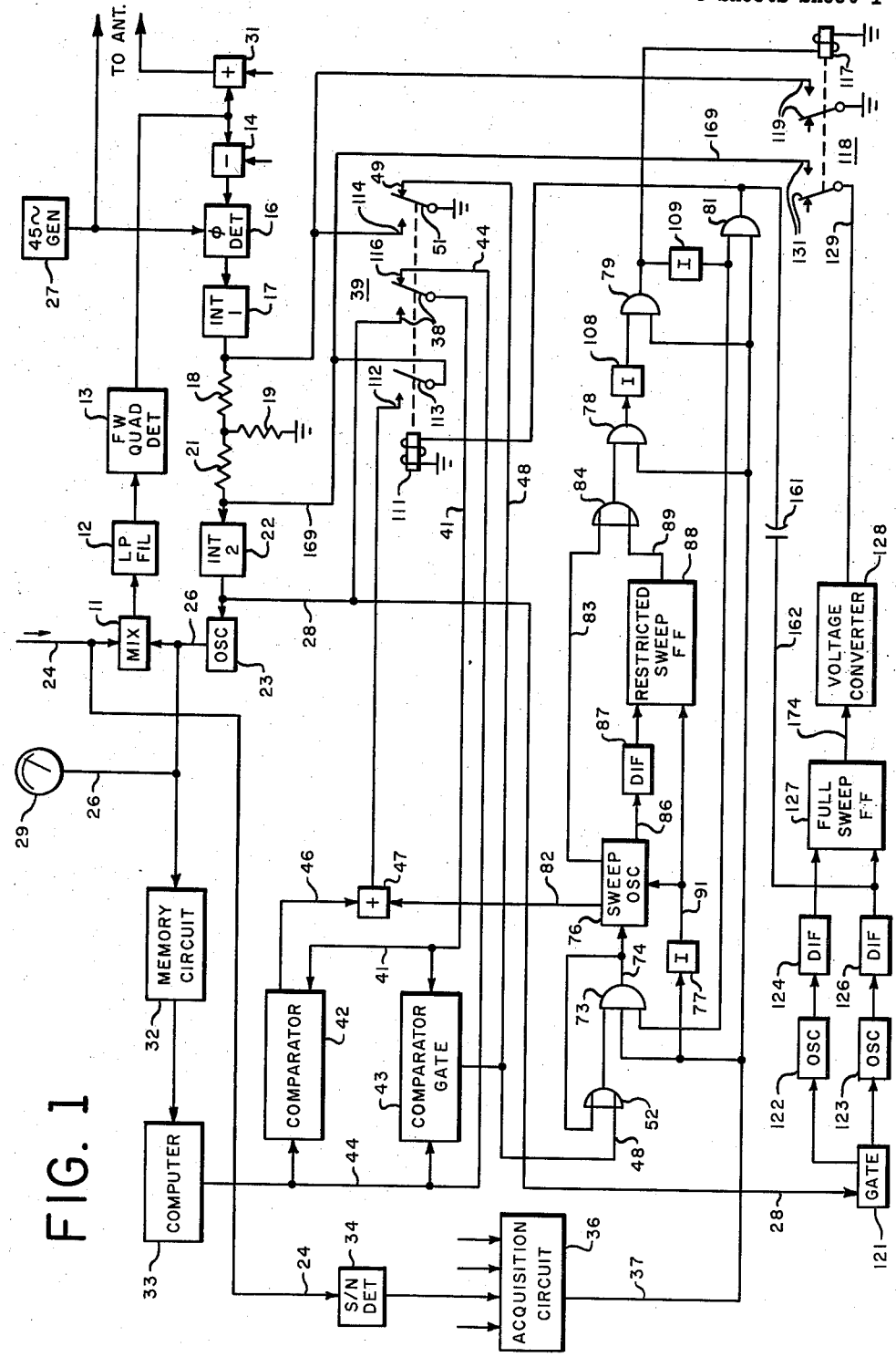
FIGURE 1 depicts the sweep and flyback circuit together with associated components of the Doppler microwave navigation system.

Referring now to FIGURE 1, the closed loop comprising mixer 11, filter 12, detector 13, subtracting circuit 14, phase detector 16, first integrator 17, resistors 18, 19 and 21, second integrator 22, and oscillator 23, constitutes part of the frequency tracker described in the above application. A second, similar frequency tracker loop, not shown, is connected to the subtracting circuit 14. A signal containing Doppler frequencies is applied at conductor 24. Output taken from the oscillator output 26 consists of a single frequency equalling the center frequency of the Doppler spectrum of frequencies and represents the aircraft ground speed.

In the operation of this frequency tracker, the input Doppler spectrum is heterodyne demodulated to a zero center frequency in mixer 11 and filtered by filter 12 so that only a band of frequencies about the crossover frequency of the lobed Doppler spectra representing the tracking error remain. This signal is detected, subtracted, then phase detected relative to a 45 c.p.s. generator 27 output to produce a direct current signal representing by its amount and sense the Doppler frequency tracking error. This error signal is doubly integrated in the two integrators 17 and 22 in tandem to produce a direct-current signal at conductor 28 which, applied to the oscillator 23, controls its frequency. Feedback around the loop tends to reduce the error signal to zero, causing the output from integrator 22 to become constant, with resulting constancy of frequency output of the oscillator 23. This occurs when the oscillator frequency is that of the crossover frequency of the lobed Doppler spectrum. The output frequency in conductor 26 is indicated in speed units on a speed indicator 29.

The advantage of double integration is that, under conditions of constant aircraft velocity or constant aircraft acceleration, the steady-state error becomes zero. Loop operation is substantially the same as with a single integrator.

The frequency tracker loop is also connected to a summing circuit 31, the output of which is connected, through additional components, to control the microwave antenna so that it is aligned or stabilized with the direction of the velocity of the aircraft. This arrangement, however, forms no part of the present invention.

The conductor 26 is connected to a memory circuit 32 which retains the latest value of the applied signal in the event of signal failure. The memory circuit 32 applies its output to a computer 33 which emits a direct voltage within the range $-18$ volts to $+18$ volts, representing by its amount the remembered signal representing aircraft speed.

Signals representing Doppler signal amplitude and noise amplitude are secured from the frequency tracker loop and its inputs and are applied through conductors such as conductor 24 to a signal-to-noise detector 34. This detector is one of four, one being provided for each of the four microwave beam signals. The four signal-to-noise detector outputs are applied to an acquisition logic circuit 36 which judges whether or not the acquired beams are sufficient for reliable operation of the system. If the S/N detectors find that the Doppler signals are strong enough compared to the noise signals for any one scan, the acquisition circuit 36 emits, on conductor 37, a direct-current signal of nearly zero voltage, for example, a voltage between the limits of 0 and $+2$ volts. If, however, the Doppler signals of all four scans are too weak, the acquisition circuit output on conductor 37 is about $+20$ volts.

The integrator output conductor 28 is connected through the contacts 38 of a relay 39 and conductor 41 to an input of a comparator 42 and an input of a comparator gate 43. Other inputs of the comparator and comparator gate are taken from the output conductor 44 of the computer 33. The comparator output conductor 46 is connected to one input of a summing circuit 47. The output conductor 48 of the comparator gate 43 is connected to ground through normally closed contacts 49 and 51 of the relay 39 and is also connected to one input of an OR circuit 52.

Figure 2:
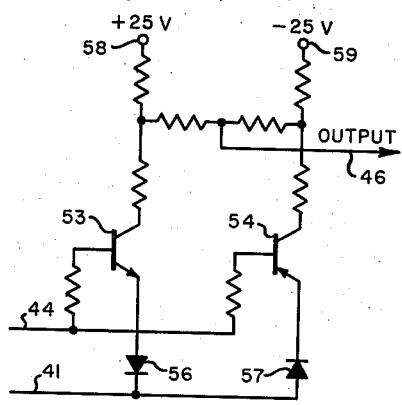
FIGURE 2 is the schematic diagram of the comparator circuit.

The comparator circuit is shown in FIGURE 2. The input conductor 44 is connected through resistors to the bases of two transistors, an NPN transistor 53 and a PNP transistor 54, and the other input conductor, 41, is connected through two diodes, 56 and 57, to the two emitters. The collectors are connected to positive and negative source terminals 58 and 59, and a symmetrical network consisting of six resistors connects the two collectors.

In operation, when the two input potentials on conductors 44 and 41 are equal or within less than about one volt of each other, both transistors are nonconductive and the output conductor 46 is at or very near zero or ground potential. When the input potentials are unequal and conductor 44 is more positive than conductor 41 by one volt or more, transistor 53 becomes conductive and the output conductor 46 becomes negative. When conductor 41 is more positive than conductor 44 by one volt or more, transistor 54 becomes conductive and the output conductor becomes positive.

Figure 3:
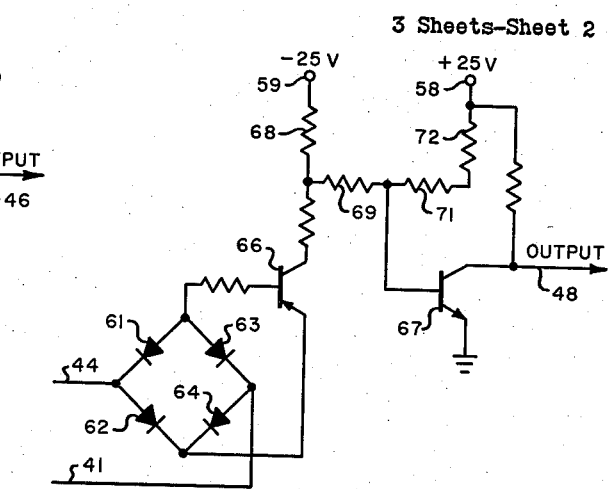
FIGURE 3 is the schematic diagram of the comparator gate circuit.

The comparator gate circuit is shown in FIGURE 3. It comprises a rectifier bridge of four diodes, 61, 62, 63 and 64, with two transistors 66 and 67. Positive and negative source terminals 58 and 59 are joined by a resistor network, the resistance of resistors 68 and 69 being equal to that of resistors 71 and 72.

In operation, when the potentials of the input conductors 41 and 44 are equal, or within about 1½ volts of each other, no base current flows in transistor 66, which is therefore nonconductive, causing transistor 67 also to be nonconductive since its base is at zero or ground potential. The potential of the output conductor 48 is then $+25$ volts. When, however, the potential difference between the inputs is 1½ volts or more, the sign being immaterial, transistor 66 becomes conductive, turning transistor 67 fully on and reducing the potential of the output conductor 48 to nearly ground potential.

The output of OR circuit 52, FIGURE 1, is applied to an AND circuit 73 having output at conductor 74. This output is connected to a second input of the OR circuit 52 and also to one input of a sweep oscillator circuit 76. A second input of the AND circuit 73 is secured from the acquisition circuit output conductor 37. Conductor 37 is also connected to an inverter 77 and to AND circuits 78, 79 and 81. Inverter 77 is a logic circuit element having a binary output which is the opposite of its input. It may comprise an amplifier having an odd number of amplifying states. When its two possible voltages are, for example, zero and $+20$ volts, its output voltages are $+20$ and zero, respectively.

The sweep oscillator circuit 76 has an output conductor 82 which applies slewing potential to the summing circuit 47. A second output conductor 83 is connected to an OR circuit 84. A third output conductor 86 is applied to a differentiating circuit 87. The differentiated output is applied to a restricted sweep flip-flop circuit 88, the output 89 of which is connected to the OR circuit 84. The output of inverter 77 is connected through conductor 91 to the reset input terminals of both the sweep oscillator 76 and the restricted sweep flip-flop 88.

Figure 4:
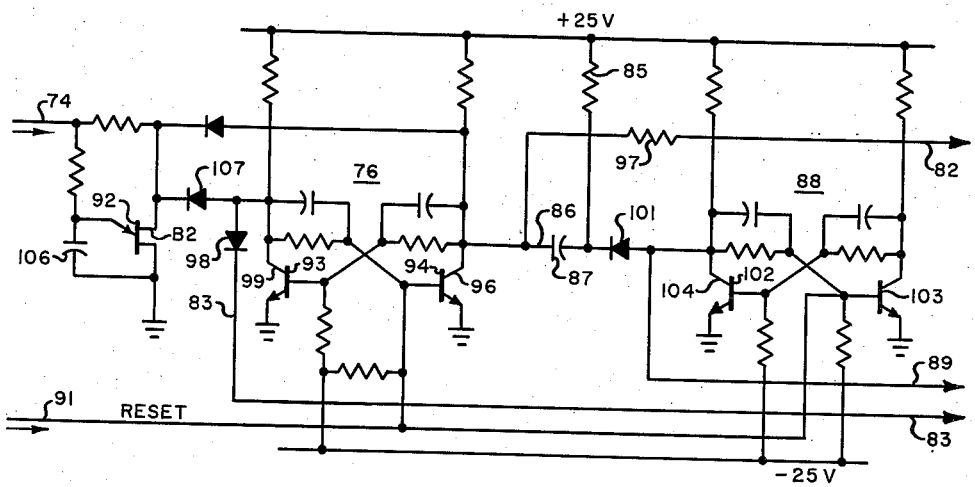
FIGURE 4 is the schematic diagram of the sweep oscillator and restricted sweep flip-flop circuits.

The circuits of the sweep oscillator circuit 76, differentiating circuit 87 and restricted sweep flip-flop circuit 88 are shown in FIGURE 4. The sweep oscillator comprises a unijunction 92 and a bistable multivibrator employing transistors 93 and 94. The voltage supply to the unijunction is secured through conductor 74 from the AND circuit 73, FIGURE 1. The unijunction is connected as a relaxation oscillator with a period of approximately 10 seconds. The slew output from the sweep oscillator 76, FIGURE 4, is taken from the collector 96 of transistor 94 through a resistor 97 and conductor 82. The output to the OR circuit 84, FIGURE 1, is taken through a diode 98 and conductor 83 from the collector 99 of transistor 93. The output to the differentiating circuit is taken from collector 96 through conductor 86.

The differentiating circuit comprises a capacitor 87 and resistor 85, FIGURE 4. This series capacitor is connected through a diode 101 to the restricted sweep flip-flop 88 employing transistors 102 and 103. This is a bistable multivibrator slaved to the sweep oscillator and operated in either direction by a downgoing pulse applied through the differentiating capacitor 87. Output is taken from the collector 104 of transistor 102 through conductor 89.

Figure 5:
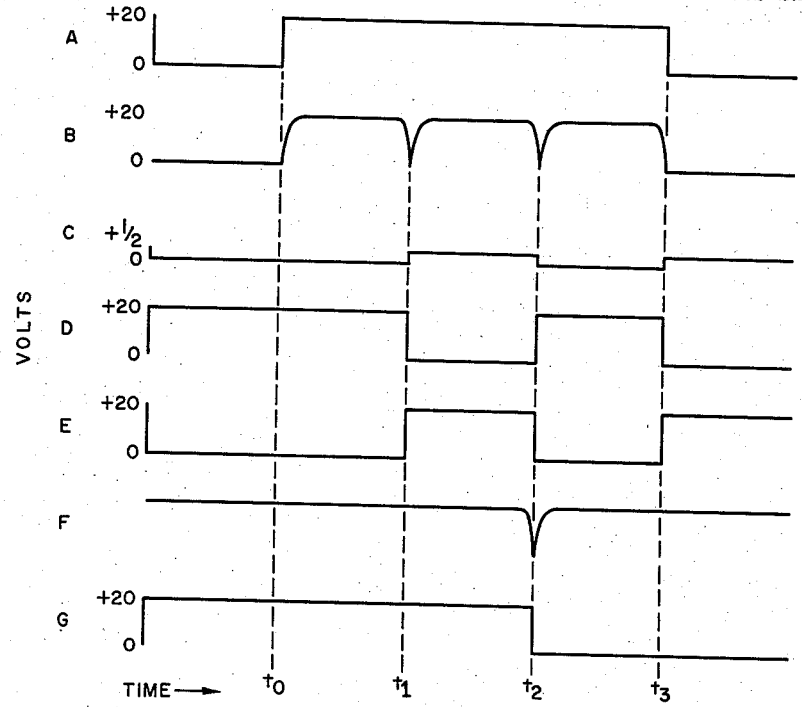
FIGURE 5 depicts graphs illustrating operation of the sweep oscillator.

In the operation of the circuits of FIGURE 4, previous reset operation has applied positive potential on conductor 91 to make transistors 94 and 103 conductive and transistors 93 and 102 nonconductive. This potential is terminated and positive potential applied through conductor 74 initiates operation. This is illustrated by the graph A of FIGURE 5 at time $t_0$. The potential applied through conductor 74 commences to charge the relaxation oscillator capacitor 106. At the end of 10 seconds, at time $t_1$, the unijunction 92 suddenly becomes conductive, producing a negative pulse at base 2(B2), as shown in graph B. This negative pulse, passing through diode 107, makes transistor 93 conductive. This switches conductor 83 to zero and conductors 86 and 82 to positive potential as shown by graphs D, E, and C (FIGURE 5). At the end of another 10-second period, at time $t_2$, the relaxation oscillator emits another pulse, again switching the three multivibrator output voltages. Change of the voltage, graph E, on conductor 86 is differentiated in differentiator 87 to produce a negative pulse, graph F, switching the restricted sweep flip-flop, graph G, and changing the output thereof from $+20$ volts to zero. At the end of the next 10-second period at time $t_3$, another pulse, graph B, again switches the sweep oscillator, but as upgoing pulses in conductor 86 do not switch the restricted sweep flip-flop, its output remains at zero. Thus, after time $t_3$ both the conductors 83 and 89 are at zero potential.

Summarizing this operation, either or both inputs to the OR circuit 84, FIGURE 1, are positive before start of the operation and during the operation, but 30 seconds after the start of the operation, at time $t_3$, both inputs of the OR circuit become zero, causing its output also to become zero. The function of the sweep oscillator and restricted sweep flip-flop circuit, then, is two-fold. It generates a 30-second time period and at the end emits a signal consisting of the reduction of the output of OR circuit 84 to zero, and it applies a slewing voltage to the summing circuit 47 having a rectangular waveform and a ten-second half period.

The output of OR circuit 84, FIGURE 1, is connected to an input of AND circuit 78. Its output is connected to an inverter, 108, similar to inverter 77. The inverter output is connected to an input of AND circuit 79 and the output of the latter is connected through an inverter 109 to an input of AND circuit 81. Inverter 109 is similar to the other two inverters. Its output is also connected back to a third input of AND circuit 73.

The output of AND circuit 81 is connected to the coil 111 of relay 39. The contacts 112, 113, and 114 of the relay are connected to the output of summing circuit 47, the input of integrator 22 and the output of integrator 17 respectively. The normal contact 116 is connected to the output conductor 44 of the computer 33. The output of AND circuit 79 is also connected to the coil 117 of a relay 118. The output of integrator 17 may be connected to ground through the normally open contacts 119 of relay 118.

The full sweep and flyback subassembly consists of a gate circuit 121, two oscillators 122 and 123, two differentiating circuits 124 and 126, a full sweep flip-flop 127 and a voltage converter 128. Input is applied to gate circuit 121 from the output conductor 28 of integrator 22 and output is derived from the voltage converter 128, through conductor 129 and normally open contacts 131 of relay 118, and applied to the input of integrator 22.

Figure 6:
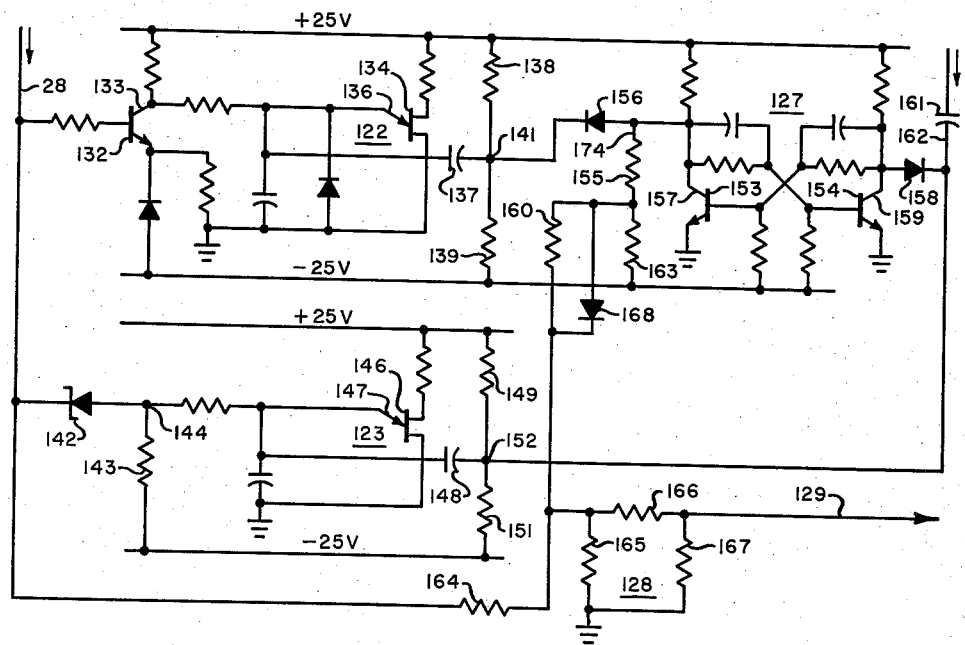
FIGURE 6 is the schematic diagram of the full sweep and flyback subassembly circuit.

The circuit of the full sweep and flyback subassembly is shown in FIGURE 6. Conductor 28 is connected to a portion of the gate circuit comprising transistor 132. Output is taken from the collector 133 to oscillator 122. This is a relaxation oscillator comprising a unijunction 134 and having a frequency of oscillation of several kilocycles per second. A sawtooth output is taken from the emitter 136 and is applied to a differentiating circuit consisting simply of the capacitor 137 and resistors 138 and 139. Output is taken from the junction 141.

The input conductor 28 is connected to a second part of the gate circuit consisting of a five-volt Zener diode 142 and resistor 143. The gate circuit junction 144 is connected to oscillator 123, which is a relaxation oscillator comprising unijunction 146 and having a frequency of oscillation of several kilocycles per second. A sawtooth output is taken from the emitter 147 and applied to a differentiating circuit consisting of capacitor 148 and resistors 149 and 151. The differentiated output is taken from junction 152.

The full sweep flip-flop 127 is a bistable multivibrator comprising transistors 153 and 154. Input from junction 141 is applied through diode 156 to the collector 157 of transistor 153 and input from junction 152 is applied through diode 158 to the collector 159 of transistor 154. A reset input is applied through capacitor 161 and conductor 162 from the AND circuit 81, FIGURE 1, to the diode 158. The output of the full sweep flip-flop is taken from collector 157 through conductor 174 and applied to the voltage converter 128.

The voltage converter 128 consists of seven resistors, 155, 160, 163, 164, 165, 166 and 167, a diode 168, and a connection to the input conductor 28. The function of this network is to convert the potentials at collector 157 of approximately zero and +25 volts to potentials at the output conductor 129 suitable for application to the input of integrator 22. These potentials are +5.74 volts for flyback and −½ volt for sweep.

In the operation of the full sweep and flyback subassembly as shown in FIGURE 6, the previous condition of the Doppler navigator having been the tracking condition, a negative pulse through input 162 has reset the full sweep flip-flop 127 so that the transistor 154 conducts and the output from the voltage converter 128 on conductor 129 is +5.74 volts. This is the output for flyback, but when the relay 118, FIGURE 1, is unoperated the output conductor 129 is open at the relay contacts 131. The input on conductor 28 may have any value but generally will not be at a limiting value. When full sweep is called for, relay 118 closes, applying +5.74 volts through conductors 129 and 169 to the input of integrator 22. The output of integrator 17 is grounded. The output of integrator 22 rapidly flies back until it reaches −18 volts corresponding to maximum aircraft speed. This causes the unijunction 134, FIGURE 6, to commence oscillating. The action of this oscillator generates the differentiated pulse through capacitor 137 to the full sweep flip-flop 127 to its other state, making transistor 153 conductive and changing the output voltage in conductor 129 to −½ volt. This is applied to the input of integrator 22, reversing its output change. The output voltage now slowly rises until its reaches +18 volts corresponding to minimum aircraft speed. At this point the unijunction 146 commences oscillating and a downgoing output, differentiated by capacitor 148, is applied through diode 158 again to change the state of the full sweep flip-flop 127, producing +5.74 volts output at conductor 129.

In the operation of the entire sweep and flyback circuit, the initial conditions established during tracking or at initial turnon are as follows. A negative pulse through input 162, FIGURE 1, has reset the full sweep flip-flop 127 so that the output from the voltage converter 128 is +5.74 volts. Positive potential on conductor 91 from the inverter circuit 77 has reset both the sweep oscillator 76 and the restricted sweep flip-flop 88 so that potentials are applied to both inputs of the OR circuit 84. The acquisition circuit 36 output voltage on conductor 37 is zero, so that the output of AND circuit 81 is zero and the relay 39 is unoperated. The otuput of AND circuit 79 is zero so that the relay 118 is unoperated. The integrators 17 and 22 are disconnected by the relays from all parts of the sweep and flyback circuit except the gate circuit 121. The output of integrator 22 is stationary, or nearly so, and in general is not at its upper or lower voltage limit. Assume that its potential is −10 volts. The oscillators 122 and 123 are therefore not triggered and are not oscillating. The output of computer 33 may have any value. Assume that, either through memory or fortuitously, the value at conductor 44 is +5 volts.

Now suppose that, either through failure of the Doppler signal or because of initial turnon the input to the acquisition circuit 36 represents an insufficient signal. The output of the acquisition circuit then becomes +20 volts. This is applied to AND circuit 73, to inverter 77 making its output zero, to AND circuit 78, AND circuit 79 and AND circuit 81. Since AND circuit 79 output is zero, the inverter 109 inverts this to +20 volts which it applies to AND circuit 81, turning it on. This energizes coil 111, operating relay 39. This grounds the output of integrator 17, preventing tracker loop interference with the sweeping operation. It also lifts the short circuit from the inputs of the comparator 42 and comparator gate 43 and connects the integrator output conductor 28 to these input circuits. The circuit is closed from the summing circuit 47 to the input of integrator 22.

The potentials of +5 volts and of −10 volts are now applied to both the comparator 42 and the comparator gate 43. The latter emits an output of zero volts, so that the OR circuit 52, AND circuit 73 and the sweep oscillator 76 remain unoperated. The comparator 42, because its inputs are different, emits a potential which is applied through the summing circuit 47 and relay contacts to the input of integrator 22, with such sense as to cause the integrator output to rise toward the computer output of +5 volts. This action is indicated in FIGURE 7 by the line 170 sloping upward from −10 volts toward +5 volts.

If during this rise the integrator output applied to the frequency tracker loop has not caused acquisition of the Doppler signal, when the two input signals imposed on the comparator 42 are within 1 volt of equality the output drops to zero. Meanwhile, when the two signals imposed on the comparator gate 43 are within 1½ volts of equality, the comparator gate applies +25 volts to the OR circuit 52, operating it, and applying potential to the AND circuit 73. Since both other inputs to this AND circuit have been energized, the AND circuit 73 emits an output. This output is fed back to the OR circuit 52, locking the AND circuit 73 conductive in the event of loss of signal in conductor 48. The sweep oscillator 76, restricted sweep flip-flop 88 and OR circuit 84 now operate as described, for 30 seconds transmitting a rectangular waveform of 10 second half-period, as in FIGURE 5C, to the summing circuit 47 and through it and the relay contacts to the input of integrator 22. This varies the integrator output potential as shown by the triangular sections 170, 171 and 172 of FIGURE 7. At the end of 30 seconds, if a Doppler signal has not been acquired, the output of the OR circuit 84 becomes zero, making the output of AND circuit 78 zero and the output of the inverting circuit 108 of positive potential. This makes AND circuit 79 conductive, operating coil 117 of relay 118. The signal from AND circuit 79 being reversed through inverter 109, causes the output of AND circuit 81 to become zero, releasing relay 39. These actions disconnect the restricted sweep components from the input of integrator 22 and connect the full sweep components to it. As potential of +5.74 volts is present on conductor 129, this relay action applies this potential to the integrator input, causing it to fly back. This is indicated in FIGURE 7 by the dashed line segment 173. As previously described, the full sweep from −18 to +18 volts at the integrator output now proceeds, taking about 100 seconds, with 5-second flyback from +18 volts to −18 volts. This sweep from −18 to +18 volts causes the frequency tracker to search the Doppler spectrum range corresponding to minimum and maximum aircraft speed.

Figure 7:
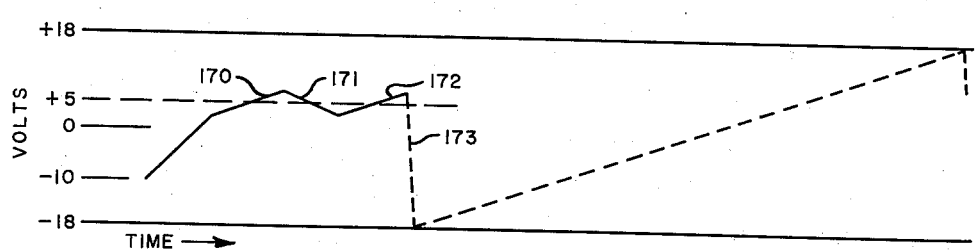
FIGURE 7 is a graph of the integrator output potential during restricted and full sweeps.

If, at the beginning of the search operation, the output of the integrator 22 is between its upper limit of +18 volts and the approximate value of +5 volts for conductor 44, the graph of FIGURE 7 is modified by starting at the potential of integrator 22, descending rapidly to near +5 volts, then approaching the start of the sweep 171. Thereafter operation proceeds as described.

If at any time during either the restricted sweep or full sweep a signal is acquired, it causes the acquisition circuit output in conductor 37 to fall to zero. This causes the outputs of either AND circuit 81 or AND circuit 79, whichever is in service, to fall to zero, returning its relay to normal and ending the sweep and flyback operation.

What is claimed is:

1. A sweep and flyback circuit comprising, frequency tracker means including an integrator, restricted sweep means for applying a restricted potential to the input of said integrator, full sweep means for applying full potential to the input of said integrator, switch means operated by said restricted sweep means after a selected number of operations of said restricted sweep means for initiating operation of said full sweep means, and acquisition means connected with said frequency tracker means for initiating operation of said restricted sweep means and for terminating operation of both said restricted sweep means and said full sweep means.

2. A sweep and flyback circuit comprising, frequency tracker means including an integrator, restricted sweep means applying a square wave of restricted potential to the input of said integrator whereby the integrator output sweeps over a restricted range, full sweep means applying full potential to the input of said integrator whereby the integrator output sweeps over a full range, switch means operated by said restricted sweep means after a selected number of restricted sweeps for initiating the operation of said full sweep means, and acquisition switching means operated from said frequency tracker means for initiating and terminating operation of said restricted sweep means and for terminating operation of said full sweep means.

3. A sweep and flyback circuit for a Doppler navigator comprising, frequency tracker means including an integrator, computer means connected to said frequency tracker means for selecting a restricted portion of Doppler spectrum and emitting an output signal representative thereof, restricted sweep means controlled by said output signal and applying a square wave signal representative thereof to the input of said integrator whereby the integrator output emits a triangular sweep potential over a restricted range to sweep said frequency tracker means over said restricted portion of Doppler spectrum, full sweep means applying a square wave signal to the input of said integrator whereby the integrator output emits a sweep and flyback potential over a full range to sweep and fly back said frequency tracker means over a full Doppler spectrum range, switch means operated by said restricted sweep means after a selected number of restricted sweeps for initiating operation of said full sweep means, and aquisition switching means operated by said frequency tracker means for initiating and terminating operation of said restricted sweep means and for terminating operation of said full sweep means.

4. A sweep and flyback circuit for a Doppler navigator comprising, a frequency tracker loop including an integrator, computer means connected to said frequency tracker for selecting a restricted portion of Doppler spectrum in which a Doppler signal is most likely to be found and emitting a signal representative of the restricted portion, restricted sweep means controlled by said signal and applying a balanced square wave voltage signal representative thereof to the input of said integrator causing the integrator output to emit a triangular sweep potential over a restricted range and thereby sweeping said frequency tracker over said restricted portion of Doppler spectrum, said restricted sweep means including means for terminating the sweeping action thereof after a selected number of restricted sweeps and emitting an output signal on termination of said sweeping action, full sweep means applying an unbalanced square wave voltage signal to the input of said integrator causing the integrator output to emit sweep and flyback potentials over a full range to sweep said frequency tracker continuously over a full Doppler spectrum range, switch means operated by the output signal of said restricted sweep to activate said full sweep means, acquisition means connected to said frequency tracker for emitting an output signal having alternate values representing the presence or absence of an acquired Doppler signal, and switch means operated by said acquisition means for isolating the input of said frequency tracker and initiating operation of said restricted sweep means and for terminating operation of said restricted sweep means and said full sweep means upon acquisition of a Doppler signal.

5. A sweep and flyback circuit for a Doppler navigator comprising, a frequency tracker loop including an integrator, computer means connected to said frequency tracker loop producing a computer output signal the magnitude of which is dependent on the frequency of the Doppler signal last imposed on said Doppler navigator, signal-to-noise ratio detector means connected to said frequency tracker loop and producing an output signal representative of the ratio of usable input signal to noise, acquisition means operated by the output signal of said signal-to-noise ratio detector and emitting an output signal having a first value when the ratio of usable input signal to noise is above a selected level and a second value when the ratio of usable input signal to noise is below said selected level, a comparator having said computer output signal and the output of said integrator imposed thereon and producing an output signal when the computer output and integrator output signals are substantially different, switch means operated by said first value output signal of said acquisition means for isolating the input of said integrator from the frequency tracker loop and connecting the integrator input to the output of the comparator, a comparator gate having said computer output signal and the output of said integrator imposed thereon and producing an output signal when the computer output and integrator output signals are substantially equal, restricted sweep means generating a balanced square wave output signal, and including means for terminating the generation of said output signal after a selected number of cycles, said restricted sweep means having the output signal of said comparator gate imposed thereon and operated thereby to initiate operation of said restricted gate, full sweep means generating an unbalanced square wave, and means selectively imposing the outputs of said restricted sweep means and said full sweep means on the input of said integrator.

6. A sweep and flyback circuit for a Doppler navigator comprising.

a frequency tracker loop including an integrator, means for deriving a memory signal from said frequency tracker loop, said memory signal having a value determined by the frequency of the Doppler signal last acquired by said Doppler navigator, means for comparing said memory signal with the output of said integrator and producing a comparison signal therefrom, the sense of which is determined by the relative senses and magnitudes of said memory signal and the output of said integrator, means producing an acquisition signal when the Doppler signal falls below a selected level, means operated by said acquisition signal for imposing said comparison signal on said integrator whereby the sense and magnitude of the output of said integrator approaches that of said memory signal, means for comparing said memory signal with the output of said integrator and producing a gate signal therefrom when said memory signal and the output of said integrator have substantially the same magnitudes, means operated by said acquisition signal and said gate signal for generating a square wave signal, and means operated by said acquisition signal for imposing said square wave signal on the input of said integrator.

7. A sweep and flyback circuit for a Doppler navigator comprising, a frequency tracker loop including an integrator, means for deriving a memory signal from said frequency tracker loop, said memory signal having a value determined by the frequency of the Doppler signal last acquired by said Doppler navigator, means for comparing said memory signal with the output of said integrator and producing a comparison signal therefrom only when said memory signal and the output of said integrator are substantially different, the sense of said comparison signal being determined by the magnitude relation of said memory signal and the integrator output, means producing an acquisition signal when the Doppler signal falls below a selected level, means operated by said acquisition signal for imposing said comparison signal on said integrator whereby the output of the integrator and said memory signal approach each other in sense and magnitude, means for comparing said memory signal with the output of said integrator and producing a gate signal of fixed magnitude therefrom when said memory signal and the output of said integrator have substantially the same magnitudes, means operated by said acquisition signal and said gate signal for generating a square wave signal, and means for imposing said square wave signal on the input of said integrator.

8. A sweep and flyback circuit for a Doppler navigator comprising, a frequency tracker loop including an integrator, means for deriving a memory signal from said frequency tracker loop, said memory signal having a value determined by the frequency of the Doppler signal last acquired by said Doppler navigator, means for comparing said memory signal with the output of said integrator and producing a comparison signal therefrom only when said memory signal and the output of said integrator are substantially different, the sense of said comparison signal being determined by the magnitude relation of said memory signal and the integrator output, means producing an acquisition signal when the Doppler signal falls below a selected level, means operated by said acquisition signal for imposing said comparison signal on said integrator whereby the output of the integrator and said memory signal approach each other in sense and magnitude, means for comparing said memory signal with the output of said integrator and producing a gate signal of fixed magnitude therefrom when said memory signal and the output of said integrator have substantially the same magnitude, means operated by said acquisition signal and said gate signal for generating a first square wave signal, means for terminating said first square wave signal after a selected number of cycles thereof, means for generating a second square wave signal at least one of the alternations of which has a time duration exceeding the time duration of said first square wave signal, means for impressing said first square wave signal on the input of said integrator, and means operated subsequent to the termination of said first square wave signal for imposing said second square wave signal on the input of said integrator.

9. A sweep and flyback circuit for a Doppler navigator comprising, a frequency tracker loop including an integrator, means for deriving a memory signal from said frequency tracker loop, said memory signal having a value determined by the frequency of the Doppler signal last acquired by said Doppler navigator, means for comparing said memory signal with the output of said integrator and producing a comparison signal therefrom only when said memory signal and the output of said integrator are substantially different, the sense of said comparison signal being determined by the magnitude relation of said memory signal and the integrator output, means producing an acquisition signal when the Doppler signal falls below a selected level, means operated by said acquisition signal for imposing said comparison signal on said integrator whereby the output of the integrator and said memory signal approach each other in sense and magnitude, means for comparing said memory signal with the output of said integrator and producing a gate signal of fixed magnitude therefrom when said memory signal and the output of said integrator have substantially the same magnitude, means operated by said acquisition signal and said gate signal for generating a first square wave signal, means for terminating said first square wave signal after a selected number of cycles thereof, means for generating a second square wave signal, said last named means including means connected to the output of said integrator for initiating one alternation of the square wave cycle when the integrator output reaches a first selected limit and initiating the other alternation of the square wave cycle when the integrator output reaches a second selected limit, means for impressing said first square wave signal on the input of said integrator, and means operated subsequent to the termination of said first square wave signal for imposing said second square wave signal on the input of said integrator.

10. A sweep and flyback circuit as set forth in claim 9 including voltage converting means for adjusting the voltage magnitudes of the respective alternations of said second square wave signal to relatively different levels with respect to ground potential.

11. A sweep and flyback circuit as set forth in claim 10 in which said first square wave signal is a balanced square wave.

No references cited.